R. EWING.
DISK HARROW.
APPLICATION FILED SEPT. 21, 1908.

961,113.

Patented June 14, 1910.
2 SHEETS—SHEET 1.

Witnesses.
H. C. Trimble.
Oliver Bateman

Inventor.
Robert Ewing
by C. H. Fisher
his Attorney

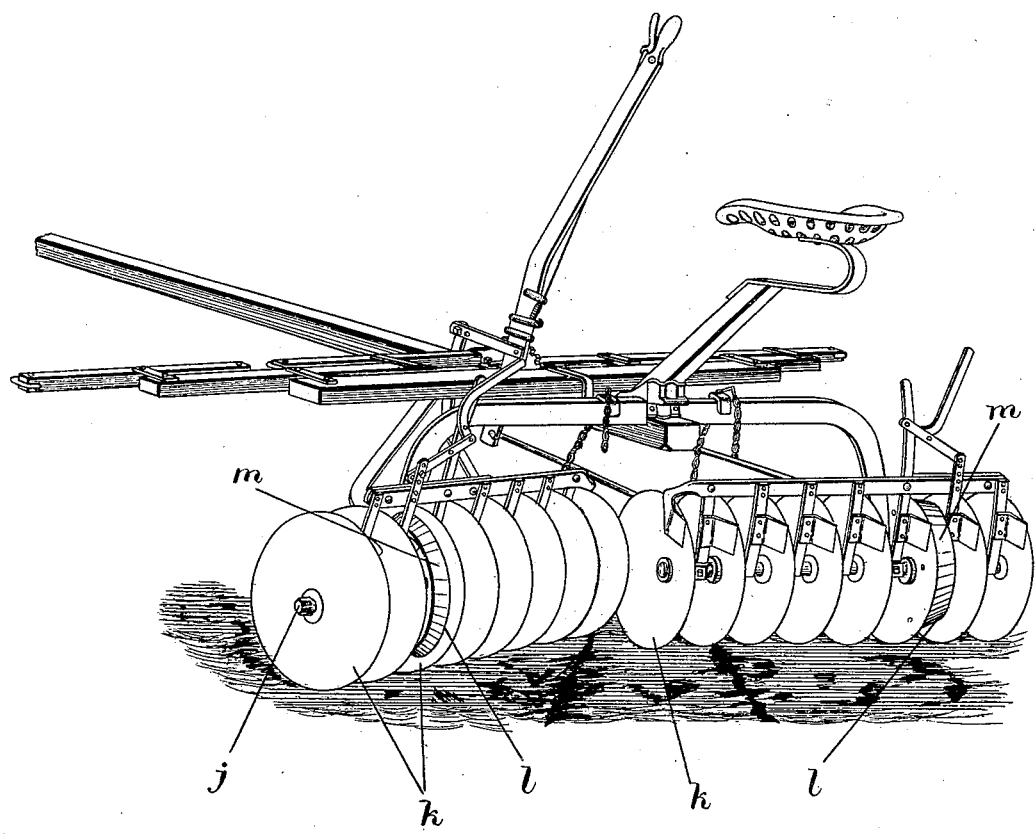

UNITED STATES PATENT OFFICE.

ROBERT EWING, OF LONDON, ONTARIO, CANADA.

DISK HARROW.

961,113.        Specification of Letters Patent.        Patented June 14, 1910.

Application filed September 21, 1908. Serial No. 454,042.

*To all whom it may concern:*

Be it known that I, ROBERT EWING, of the city of London, in the county of Middlesex and Province of Ontario, Canada, have invented certain new and useful Improvements in Disk Harrows; and I hereby declare that the following is a full, clear, and exact description of the same.

This invention relates to a disk harrow having circular shoes, attached to the disk plates, or, mounted on the axles between the disk plates to control the depth to which the disk plates may enter the soil when the gangs of disk plates are set at different cutting angles. The circular shoes may be made either unitary and capable of being interchanged, or of several segments adjustably connected together to permit of the diameter of the circular shoes being increased or decreased, to meet the requirements and the conditions under which the disk harrow is working.

For an understanding of the invention reference is to be had to the following description and to the accompanying drawings in which:—

Figure 1:
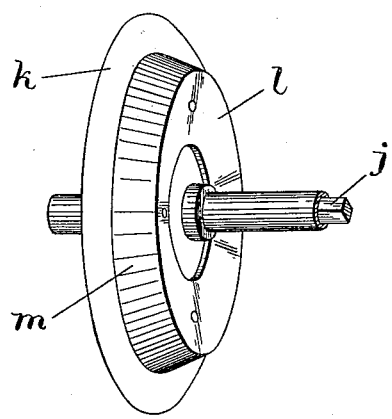
Figure 2:
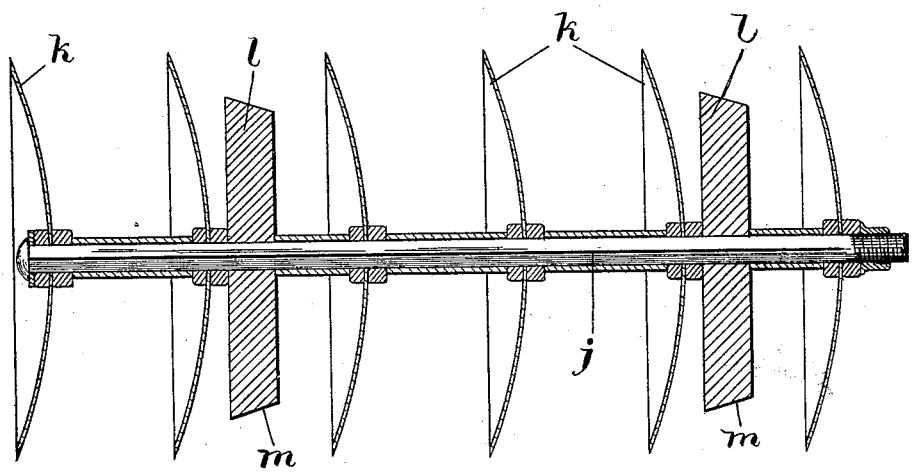
Figure 3:
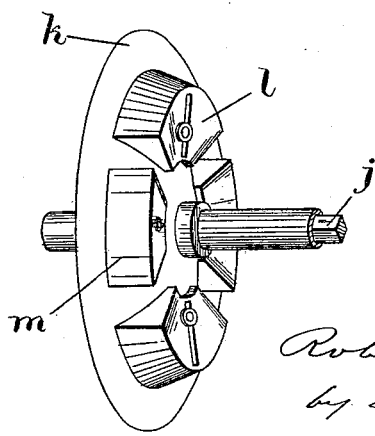

Figure 1, is a perspective view of a disk plate showing a circular shoe attached to it. Fig. 2, is a sectional view of a disk gang showing the circular shoes between the disk plates. Fig. 3, is a perspective view of a modification of the construction shown in Fig. 1, showing a circular shoe made of several adjustable segments. Fig. 4, is a perspective view of a disk harrow showing the employment of the disk shoes.

Like characters of reference refer to like parts throughout the specification and drawings.

When the disk gangs are set at a sharp angle to the line of draft the tendency of the disk plates is to severely cut and tear up the soil by entering the soil to a greater depth than when they are set parallel with the line of draft.

The object of the present invention is to provide a means by which the disk plates will be permitted to enter the soil to a uniform depth regardless of the angle at which the disk gangs are set to the line of draft, and this object is attained by providing one or more disk plates of each disk gang with a circular shoe having a peripheral surface of sufficient width to limit the entry of the disk plate into the soil. The disk plates $k$ are mounted upon the axle $j$ of the harrow and are arranged in two disk gangs which are capable of being set at different angles to the line of draft. Connected to one or more of the disk plates of each gang is a circular shoe $l$ having a peripheral surface $m$ of sufficient width to control the entry of the disk plates of each gang into the soil. In Fig. 1, the circular shoe is fastened to the disk plate and is shown to be of a unitary character. In this construction it is necessary to interchange the circular shoes when varying the depth to which the disk plates may enter the soil, but in Fig. 3, the circular shoe is shown to be of a segmental character in which the segments are adjustable to permit of the diameter of the shoe being increased or decreased by the adjustment of the segments so that the depth to which the disk plate may enter the soil may be varied without necessitating an interchange of the circular shoes as is the case with the construction shown in Fig. 1.

In Fig. 2, the circular shoes are shown mounted upon the axle between the disk plates instead of being attached to them as shown in Figs. 1 and 3. When the circular shoe is fastened to the disk plate it must of necessity revolve as the disk plate revolves during the progress of the disk harrow over the soil with the result that the peripheral surface of the circular shoe is evenly worn around its circumference. When the circular shoes are mounted on the axles between the disk plates they are arranged so that they will revolve during the revolution of the disk plates to permit of an even wear around their peripheral surfaces.

It is a well established fact in the use of disk harrows that the outer end of the disk gang, when the gang is set at an angle to the line of draft, cuts deeper than the inner end of the gang, and forms ridges or diminutive furrows. To obviate this, I have provided each disk gang with a regulating shoe $l$ limiting the cutting depth of the disk plate, and I have preferably arranged the regulating shoe on the convex side of the disk plate to determine the depth to which the gang can cut, and thus limit the cutting depth of the gang, relieve the draft, and prevent the formation of ridges and furrows.

Having thus fully described my invention what I claim as new and desire to secure by Letters Patent is:

1. The hereinbefore described device comprising two adjustable gangs of disk harrows each gang consisting of a set of concavo convex disk plates mounted to revolve unitedly upon an axle and a shoe mounted to revolve with the disk plates and limit the cutting depth of the gang.

2. The hereinbefore described device comprising two adjustable gangs of disk harrows each gang consisting of a set of concavo convex plates mounted to revolve unitedly upon an axle, and a shoe mounted to revolve with the disk plates and limit the cutting depth of the gang, the shoe being secured to the convex side of one of the disk plates of the gang.

3. The hereinbefore described device comprising two adjustable disk gangs, each disk gang consisting of a set of concavo convex disk plates mounted to revolve upon an axle, and a shoe radially adjustable with relation to the axle to limit the cutting depth of the disk gang.

4. The hereinbefore described device comprising two adjustable disk gangs, each disk gang consisting of a set of concavo convex disk plates mounted to revolve upon an axle, and a shoe for limiting the cutting depth of each disk gang consisting of a set of separable segmental sections, and means for securing the sections to the convex side of one of the disk plates so as to be radially adjustable with relation thereto.

Toronto, Sept. 2, 1908.

ROBERT EWING.

Signed in the presence of—
N. R. ROBERTSON,
C. H. RICHES.